May 19, 1936.  W. SELAKOSKY  2,041,572
AUTOMOBILE FRONT WHEEL DRIVE AXLE
Filed June 11, 1934
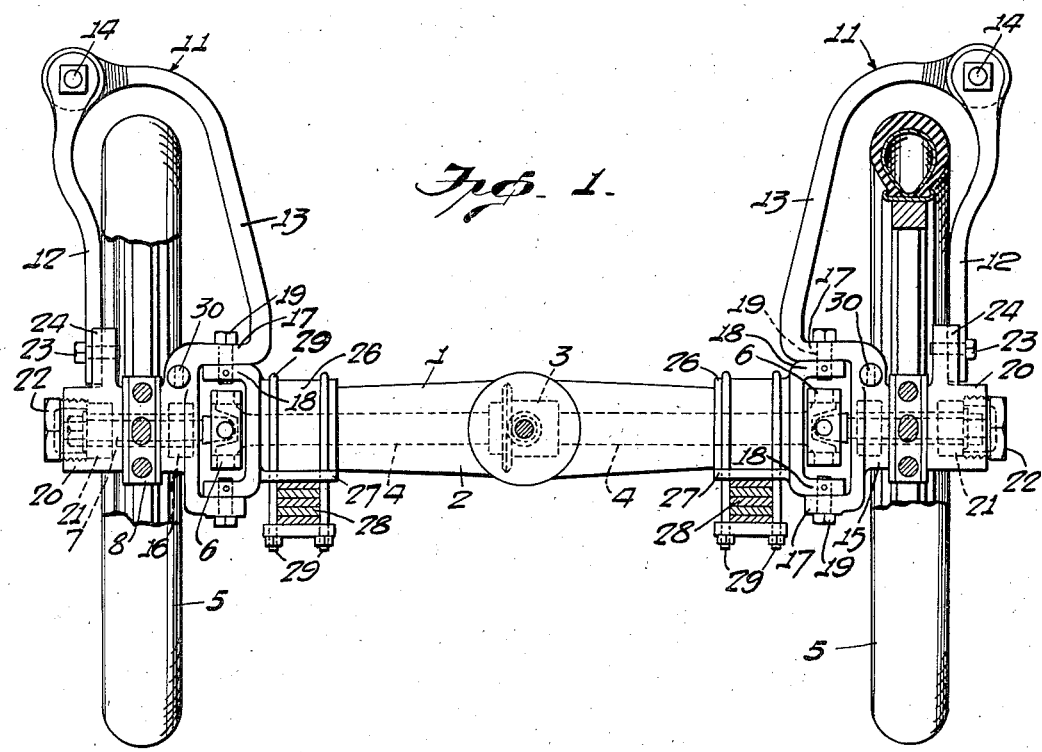
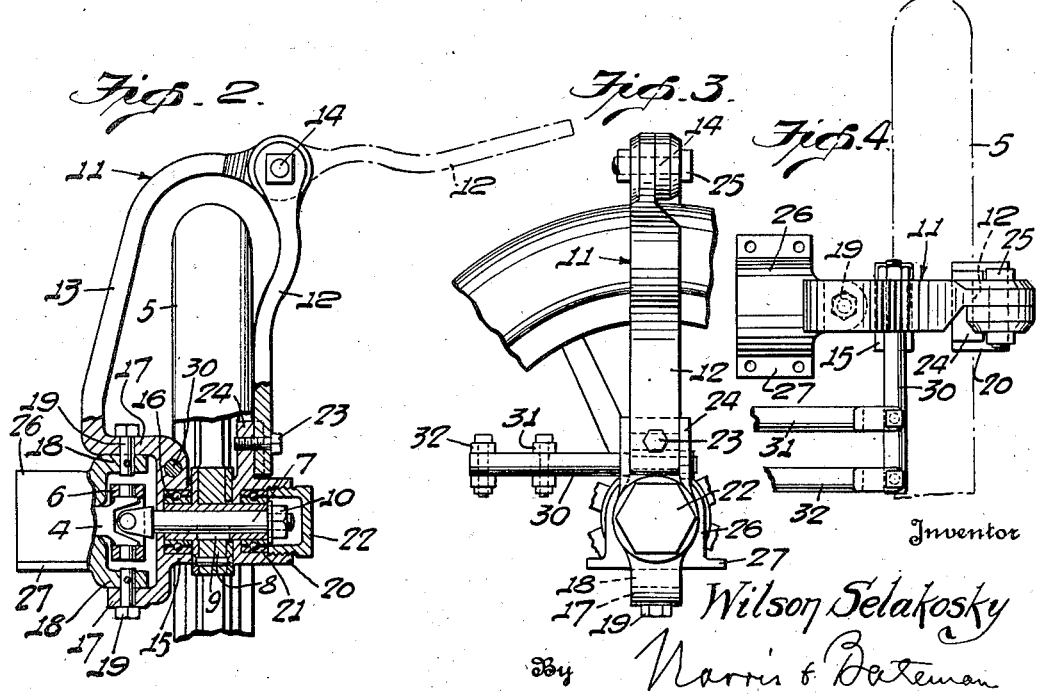
Inventor
Wilson Selakosky
By Norris & Bateman
Attorney Patented May 19, 1936

2,041,572

UNITED STATES PATENT OFFICE 2,041,572

AUTOMOBILE FRONT WHEEL DRIVE AXLE

Wilson Selakosky, White Haven, Pa.

Application June 11, 1934, Serial No. 730,168

3 Claims. (Cl. 180—43)

The present invention relates to improvements in means for mounting the front or steering wheels on automobiles and other motor vehicles, and more particularly those of the so-called front wheel drive wherein the front wheels serve to drive as well as to steer the automobile.

The primary objects of the invention are to provide improved means for mounting such front driving and steering wheels whereby the supporting means for the wheels is simplified and avoids interference with the connections of the driving shafts with the wheels, and the mounting means for the wheels are so constructed that the tires of these wheels will be readily accessible for removal, repair or replacement, when such becomes necessary.

To these and other ends, the invention consists in certain improvements and combinations and arrangements of parts, all as will be hereinafter more fully described, the features of novelty being pointed out more particularly in the claims at the end of this specification.

In the accompanying drawing:—

Fig. 1 is an elevation, partly in section, of the front wheel drive axle for an automobile, embodying wheel mounting means constructed in accordance with the present invention;

Fig. 2 is a detail view of the mounting for one of the wheels, showing the wheel hub and adjacent portions of the wheel mounting in section, and indicating by dotted lines the manner in which a portion of the mounting may be swung out of its normal operative position to enable removal or replacement of the tire of the wheel; and Fig. 3 is a side elevation, and Fig. 4 is a top plan view of one of the wheel mountings.

Similar parts are designated by the same reference characters in the different figures of the drawing.

In the preferred embodiment of the invention, as shown in the present instance, I represents generally the front axle of a front wheel drive automobile, such axle comprising a tubular housing 2 containing a differential gearing 3 which may be connected in the usual manner to the automobile engine to receive power therefrom to propel the automobile, the differential gearing being connected in the usual manner to a pair of axle shafts 4 which latter serve to drive the respective front wheels 5. Since the front wheels not only serve to drive the automobile but also serve to steer it, each of the axle shafts 4 is connected to the respective wheel by a universal joint 6 at its outer end, each of these universal joints, which may be of any usual or well-known form, being connected to a short shaft 7 which fits into the hub 8 of the respective wheel and is suitably fixed therein, as by a key 9, a nut 10 being threaded on the outer end of each shaft 7 and serving to retain the respective wheel thereon.

According to the present invention, the front driving and steering wheels are mounted on the axle by a pair of vertical brackets 11, one for each wheel. Each of these brackets, which may be composed of steel or other suitable rigid material, is substantially yoke-shaped, so that it will straddle the upper side of the wheel and may engage, by bearings, with the wheel hub at the inner and outer sides of the wheel. As shown, each bracket comprises a pair of arms or members 12 and 13 which are hinged or pivotally connected by a pivot joint 14, for a purpose hereinafter described.

The inner arm or member 13 of each bracket is formed at its lower end with an annular socket 15 containing a ball bearing 16 which is fitted on the wheel hub at the inner side of the wheel, this end of the arm 13 being bent or otherwise formed to provide upper and lower fork arms 17 to fit above and below or cooperate with the upper and lower fork arms 18 fixed on and projecting outwardly from the respective end of the axle housing, and vertical pivot pins 19 are inserted through these fork arms 17 and 18 and secure them together pivotally so that the bracket may swing horizontally about the vertical pivots 19 as axes, for steering purposes. These pivots 19 are coincident with the axis about which the universal joint flexes, as shown.

The outer arm or member 12 of each bracket is connected, at its lower end, to a bearing housing or socket 20 which contains a ball bearing 21 fitted on the wheel hub at the outer side of the wheel, and preferably a cap 22 is threaded removably into the socket 20 to retain the bearing 21 in place therein. The arm 12 of the bracket is detachably connected to this bearing socket 20 in a suitable manner, as by a screw 23 extended through the lower end of the arm 12 and threaded removably into a lug 24 extending upwardly from the socket 20. While the screw 23 is in place and tightened, it rigidly secures the bracket arm 12 to the bearing socket 20 as shown by the full lines in Fig. 2, but when this screw is removed, the bracket arm 12 is detached from the bearing socket 20 and said bracket arm may then be swung upwardly away from the wheel and into the dotted line position shown in Fig. 2, the arm 12 being then clear of the wheel and the tire thereon and enabling the tire to be changed, whenever necessary, without interference from the bracket.

The hinge or pivot joint 14 which connects the outer and inner arm of each bracket is provided with a clamping bolt 25 which, while tightened, as when the bracket arm 12 is in its normal operative position, rigidly connects the bracket arms and enables them to firmly support the wheel in proper position and also retains the bearings on the free ends of the bracket arms in their proper positions on the inner and outer ends of the wheel hub, but loosening of the bolt 25 frees the arm 12 so that when the screw 23 is removed, this arm may be swung into the dotted line position shown in Fig. 2.

The fork members 18 for attaching the wheel supporting brackets to the axle housing may be formed on or secured to the axle housing in any suitable manner, but it is preferable to form these fork members as integral portions of a pair of spring seats 26 riveted or otherwise fixed to the axle housing at its opposite ends, each of these spring seats embodying a sleeve-like portion which encircles the axle housing and in which the latter is fixed, and a relatively flat portion 27 against which the usual longitudinally extending body supporting springs 28 may be clamped by clamping bolts 29, the springs holding the axle housing in its proper position and preventing rotation, as usual.

A steering arm 30 is fixed to the inner arm of each of the wheel supporting brackets, these steering arms being pivotally connected to the respective ends of the usual steering tie bar 31 which maintains the wheels in proper angular relation, and the wheels may be connected to the usual steering column as commonly used in automobiles, by a link 32.

The oppositely positioned fork arms 17 and 18 between the ends of the axle housing and the respective wheels provide spaces between them in which the universal joints 6 of the drive shafts are accommodated, and these universal joints may be provided with suitable enclosing sleeves to protect them from dirt or other foreign matter and to retain lubricant therein.

In operation, the front wheel brackets support the ends of the axle and maintain the front wheels in upright position since, while the bolts 23 and 25 are tightened the arms or members 12 and 13 of each bracket constitute a rigid supporting structure for each wheel, although permitting the wheels to swing or pivot about the vertical pivots 19 to effect steering of the automobile as desired. When it becomes desirable or necessary to change a tire on either wheel, as occasionally becomes necessary, especially when pneumatic tires are used, the screw 23 is removed and the bolt 25 loosened, after the respective end of the axle has been lifted by a jack as usual, and the arm or member 12 of the bracket, which is at the outer side of the wheel, may then be swung upwardly and outwardly away from the wheel and toward or into the position indicated by the dotted lines in Fig. 2, the wheel being thus rendered accessible so that a tire may be removed therefrom or placed thereon without obstruction by any part of the wheel supporting bracket. After the desired tire change has been made, the bracket arm or member 12 is swung downwardly and inwardly back to its normal operative position, as shown by the full lines in Fig. 2, the screw 23 is inserted through said arm and into the lug 24 on the bearing socket 20 and tightened, and the bolt 25 is tightened to render the hinge or pivot joint rigid, the bracket being thus restored to its rigid condition for supporting the wheel.

By mounting the front or steering wheels of a front wheel drive automobile in yoke-like brackets as herein described, the interiors of the hubs of the wheels are unobstructed by the wheel mountings so that they may directly receive the driving axle shafts, thus simplifying and improving the construction of front wheel drive axles.

I claim as my invention:—

1. In a front wheel drive for automobiles comprising an axle housing and drive shaft extending therefrom and having means for securing it in the hub of the wheel, a wheel supporting bracket of yoke shape embodying inner and outer arms straddling the wheel at its inner and outer sides respectively, the inner arm of the bracket having an annular socket containing a bearing mounted on the hub of the wheel at its inner side and bent to underlie and overlie the axle housing and having means for pivotally mounting it on the axle housing, and means pivotally connecting the outer arm of the bracket to the inner arm thereof to swing outwardly away from the inner arm to render the wheel accessible for tire changing, a bearing housing containing a bearing secured on the hub of the wheel at its outer side, and means for detachably connecting the free end of the outer arm of the bracket to said bearing housing.

2. A front wheel mounting for automobiles comprising a yoke-shaped bracket forming inner and outer arms to extend to the inner and outer sides respectively of the wheel, means pivotally connecting the outer arm of the bracket to the inner arm thereof at a point near the periphery of the wheel to swing outwardly therefrom and thereby render the wheel accessible for tire changing, a bearing housing containing a bearing mounted on the hub of the wheel at its outer side and having means for retaining it on said hub, said bearing housing also having a lug extending radially therefrom, and means for detachably and rigidly securing the free end of said outer arm to said lug of the bearing housing.

3. A front wheel mounting for automobiles comprising inner and outer wheel supporting arms adapted to straddle the wheel, a bearing mounted on the hub of the wheel at the outer side thereof, a housing containing said bearing and having a lug projecting radially therefrom, means for retaining said bearing and housing on said hub, means for detachably and rigidly connecting the free end of said outer arm to the outer side of said lug of the bearing housing to permit said outer arm to swing outwardly while the bearing housing remains on the wheel hub, and a pivotal joint connecting together said inner and outer arms near the periphery of the wheel to permit the outer arm at the outer side of the wheel to swing outwardly therefrom, said pivotal joint having means for clamping it to rigidly connect said arms.

WILSON SELAKOSKY.